US009489722B2

(12) United States Patent
Jiang (10) Patent No.: US 9,489,722 B2
(45) Date of Patent: Nov. 8, 2016

(54) METHOD AND APPARATUS FOR IMPLEMENTING IMAGE DENOISING

(71) Applicant: Tencent Technology (Shenzhen) Co., Ltd., Shenzhen, Guangdong (CN)

(72) Inventor: Deqiang Jiang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 15/100,593

(22) PCT Filed: Jan. 15, 2015

(86) PCT No.: PCT/CN2015/070807
§ 371 (c)(1),
(2) Date: May 31, 2016

(87) PCT Pub. No.: WO2015/106700
PCT Pub. Date: Jul. 23, 2015

(65) Prior Publication Data
US 2016/0300328 A1 Oct. 13, 2016

(30) Foreign Application Priority Data

Jan. 17, 2014 (CN) .......................... 2014 1 0022974

(51) Int. Cl.
 *G06K 9/40* (2006.01)
 *G06T 5/00* (2006.01)
 *G06T 5/20* (2006.01)

(52) U.S. Cl.
 CPC .................. *G06T 5/002* (2013.01); *G06T 5/20* (2013.01); *G06T 2207/20012* (2013.01); *G06T 2207/20028* (2013.01)

(58) Field of Classification Search
 None
 See application file for complete search history.

(56) References Cited

U.S. PATENT DOCUMENTS 7,146,059 B1 * 12/2006 Durand .................. G06T 5/007
345/617
7,352,911 B2 * 4/2008 Maurer .................. G06T 5/002
382/260

(Continued)

FOREIGN PATENT DOCUMENTS

CN 10217705 A 9/2011
CN 102800063 A 11/2012

(Continued)

OTHER PUBLICATIONS

Anisotropic Band—Image, Zhang et al., IEEE, 978-0-7695-1, 2011, pp. 1457-1463.*

(Continued)

*Primary Examiner* — Jayesh A Patel
(74) *Attorney, Agent, or Firm* — Brinks Gilson & Lione (57) ABSTRACT

A method for implementing image denoising is provided. The method includes: calculating a tangent value of each pixel; determining whether a modulus value of the tangent value of each pixel is less than a preset threshold, if yes, determining a corresponding pixel as a non-boundary point of the image, and performing bilateral filter on a pixel determined as a non-boundary point of the image and pixels which are around the pixel and of which distances to the pixel are less than or equal to a first filtering radius; and if not, determining a corresponding pixel as a boundary point of the image, and performing bilateral filter on a pixel determined as a boundary point of the image and pixels whose distances along tangent directions and opposite directions of the tangent directions to the pixel are less than or equal to a second filtering radius.

10 Claims, 4 Drawing Sheets

(56) References Cited

U.S. PATENT DOCUMENTS

| | | | | |
|---|---|---|---|---|
| 7,702,173 | B2* | 4/2010 | Gao | H04N 1/4092 382/260 |
| 7,835,586 | B2* | 11/2010 | Porikli | G06T 5/20 382/260 |
| 7,889,949 | B2* | 2/2011 | Cohen | G06T 3/4007 382/299 |
| 8,260,076 | B1* | 9/2012 | Yang | G06F 17/10 375/350 |
| 8,452,118 | B2* | 5/2013 | Shin | G06K 9/40 382/260 |
| 8,599,289 | B2* | 12/2013 | Hong | G06K 9/40 348/241 |
| 8,761,507 | B1* | 6/2014 | Steger | G06T 5/002 382/167 |
| 2003/0179907 | A1* | 9/2003 | Bouts | G06K 9/40 382/109 |
| 2007/0098288 | A1* | 5/2007 | Raskar | G06T 7/0083 382/254 |
| 2010/0054622 | A1* | 3/2010 | Adams | G06T 3/403 382/269 |
| 2010/0272340 | A1* | 10/2010 | Bar-Aviv | G06T 5/20 382/131 |

FOREIGN PATENT DOCUMENTS

| | | |
|---|---|---|
| CN | 102938824 A | 2/2013 |
| WO | WO9903547 | 6/1999 |

OTHER PUBLICATIONS

International Search Report received in PCT Application No. PCT/CN2015/070807 dated Apr. 24, 2015.
Written Opinion of the International Searching Authority received in PCT Application No. PCT/CN2015/070807 dated Apr. 25, 2015.

* cited by examiner

METHOD AND APPARATUS FOR IMPLEMENTING IMAGE DENOISING

The present application is the national phase of International Application No. PCT/CN2015/070807, titled "METHOD AND APPARATUS FOR IMPLEMENTING IMAGE DENOISING", filed on Jan. 15, 2015, which claims priority to Chinese patent application No. 201410022974.X titled "METHOD AND APPARATUS FOR IMPLEMENTING IMAGE DENOISING" filed with the Chinese State Intellectual Property Office on Jan. 17, 2014, both of which are incorporated herein by reference in their entireties.

FIELD OF THE INVENTION

The present invention relates to the field of image processing technologies, and in particular, to a method and an apparatus for implementing image denoising.

BACKGROUND OF THE INVENTION

Digital images in reality are usually affected by an imaging device or noise interference from an external environment during digitalization and transmission. In order to acquire information that is more precise from an image, it is necessary to perform denoising processing on the image. A process of reducing noise in a digital image is referred to as image denoising, and the image denoising is a fundamental and key technology in the field of image processing technologies.

In an existing method for implementing image denoising, multiple filtering algorithms may be used to reduce noise of an image. For example, the Gaussian filter is a process of performing weighted averaging on a whole image, and a value of each pixel is obtained by performing weighted averaging on the pixel itself and values of other pixels in a neighboring region, thereby completing the image denoising. However, in the prior art, noise of the whole image is reduced by using a same filter method, and in the case of high noise, if denoising is performed with great strength, the boundary of the image is blurred and loses image details, and if denoising is performed with weak strength, it is possible that noise cannot be removed completely.

SUMMARY

Accordingly, the present disclosure provides a method and an apparatus for implementing image denoising, so as to solve the technical problem in the existing technologies that during image denoising processing, the boundary of an image is burred and therefore details on the boundary of the image are lost.

To solve the foregoing problem, the present disclosure provides the following technical solutions:

A method for implementing image denoising includes:
calculating an abscissa gradient value and an ordinate gradient value of each pixel of an image;
calculating a tangent value of each pixel by using a structure tensor and according to the abscissa gradient value and the ordinate gradient value of each pixel;
determining whether a modulus value of the tangent value of each pixel is less than a preset threshold, when the modulus value of the tangent value of each pixel is less than the preset threshold, determining a corresponding pixel as a non-boundary point of the image, when the modulus value of the tangent value of each pixel is more than or equal to the preset threshold, determining a corresponding pixel as a boundary point of the image; and
performing bilateral filter on a pixel determined as a non-boundary point of the image and pixels which are around the pixel and of which distances to the pixel are less than or equal to a first filtering radius, and performing bilateral filter on a pixel determined as a boundary point of the image and pixels whose distances to the pixel along tangent directions and opposite directions of the tangent directions are less than or equal to a second filtering radius.

An apparatus for implementing image denoising includes:
a first calculation unit, configured to calculate an abscissa gradient value and an ordinate gradient value of each pixel of an image;
a second calculation unit, configured to calculate a tangent value of each pixel by using a structure tensor and according to the abscissa gradient value and the ordinate gradient value of each pixel;
a determining unit, configured to determine whether a modulus value of the tangent value of each pixel is less than a preset threshold, when the modulus value of the tangent value of each pixel is less than the preset threshold, determine a corresponding pixel as a non-boundary point of the image, when the modulus value of the tangent value of each pixel is more than or equal to the preset threshold, determine a corresponding pixel as a boundary point of the image; and
a first filter unit, configured to perform bilateral filter on a pixel determined as a non-boundary point of the image and pixels which are around the pixel and of which distances to the pixel are less than or equal to a first filtering radius, and perform bilateral filter on a pixel determined as a boundary point of the image and pixels whose distances to the pixel along tangent directions and opposite directions of the tangent directions are less than or equal to a second filtering radius.

It can be seen that, the present disclosure has the following beneficial effects:

In the embodiments of the present invention, a tangent value of each pixel is calculated, and it is determined, according to a modulus value of the tangent value of each pixel, whether a pixel is a boundary point or a non-boundary point of the image. If a pixel is a non-boundary point of the image, the pixel and pixels which are around the pixel and of which distances to the pixel are less than or equal to a first filtering radius are sampled for filtering; in this manner, more sample points are taken, and a result is smoother, so that noise is completely removed. If a pixel is a boundary point of the image, starting from the pixel, only pixels along tangent directions and opposite directions of the tangent directions are sampled for filtering, thereby preserving the sharpness of the boundary while reducing noise.

DESCRIPTION OF EMBODIMENTS

In order to make the features and advantages of the present disclosure clearer and easier to understand, the embodiments of the present invention are further described in detail below with reference to the accompanying drawings and specific implementation manners.

To solve the technical problem in the existing technologies that noise of a whole image is reduced by using a same filter method, and in the case of high noise, if denoising is performed with great strength, the boundary of the image is blurred and loses image details, and if denoising is performed with weak strength, it is possible that noise cannot be removed completely, the embodiments of the present invention provide a method and an apparatus for implementing image denoising, in which pixels of an image are classified into boundary points and non-boundary points, and different filter methods are used for boundary points and non-boundary points of the image, so that noise of the non-boundary points is completely removed, and the sharpness of the boundary can be effectively preserved while noise is reduced.

The embodiments of the present invention are described from the perspective of an apparatus for implementing image filtering. The apparatus for implementing image filtering may be integrated in a client. The client may be loaded in a terminal. The terminal may be a smart phone, a tablet computer, an electronic reader, a Moving Picture Experts Group Audio Layer III (MP3) player, a Moving Picture Experts Group Audio Layer IV (MP4) player, a laptop portable computer, a desktop computer, or the like.

Figure 1:
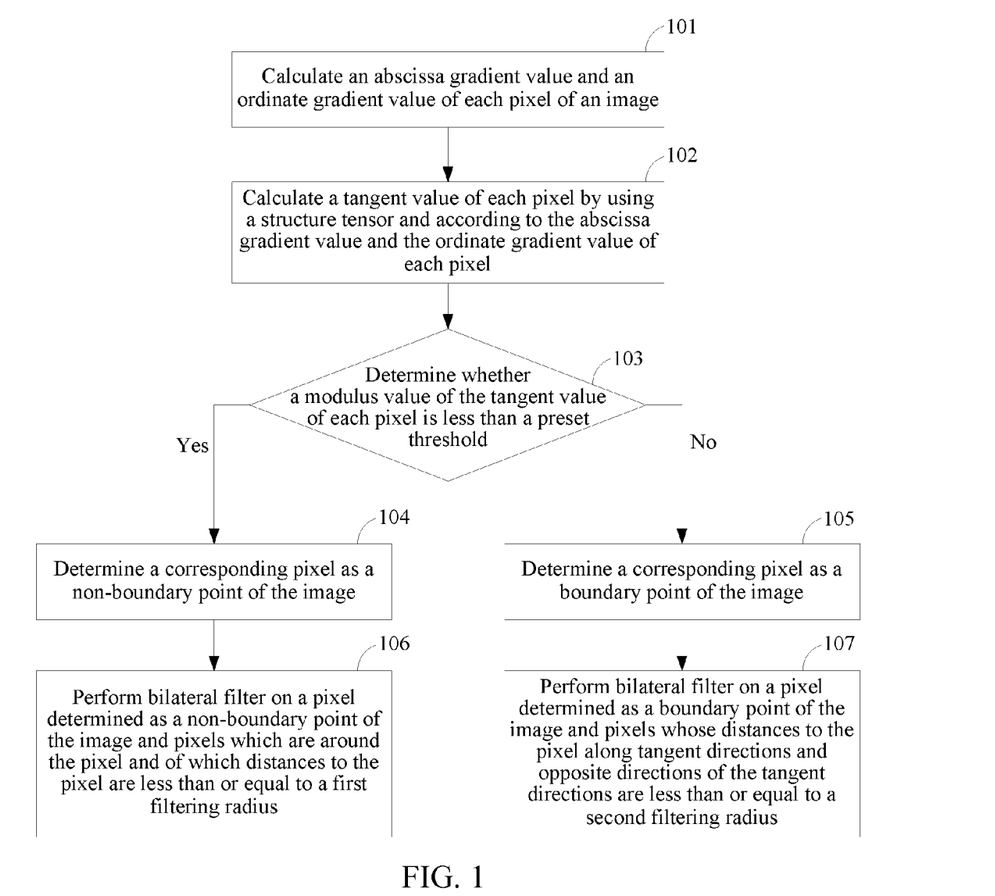
FIG. 1 is a flowchart of Embodiment 1 of a method for implementing image denoising according to an embodiment of the present invention.

As shown in FIG. 1, Embodiment 1 of a method for implementing image denoising according to an embodiment of the present invention may include the following steps:

Step 101: Calculate an abscissa gradient value and an ordinate gradient value of each pixel of an image.

A digital image consists of discrete pixels, that is, a digital image can be regarded as a two-dimensional discrete function, and a gradient of the image is equivalent to a derivative of the two-dimensional discrete function. An edge of an image is generally obtained by performing a gradient operation on the image.

A formula for the definition of an image gradient is $G(x, y)=dx(i, j)+dy(i, j)$, where $dr(i, j)=I(i+1, j)-I(i, j)$, $dy(i, j)=I(i, j+1)-I(i, j)$, I is a value of an image pixel, and $(i, j)$ is coordinates of a pixel. In this way, the abscissa gradient value of each pixel is $dx(i, j)$, and may be denoted by d; the ordinate gradient value of each pixel is $dy(i, j)$, and may be denoted by dy.

In some embodiments of the present invention, the calculating an abscissa gradient value and an ordinate gradient value of each pixel of an image may be specifically implemented as follows:

calculating the abscissa gradient value and the ordinate gradient value of each pixel of the image by using a Soble operator.

In an actual application, the Soble operator may be used to calculate gradient values of the image, to extract the edge of the image. The Soble operator is a discrete difference operator, for which a fast convolution function can be used, and the calculation is simple and effective.

Step 102: Calculate a tangent value of each pixel by using a structure tensor and according to the abscissa gradient value and the ordinate gradient value of each pixel.

After the abscissa gradient value dx of each pixel and the ordinate gradient value dy of each pixel are obtained, the tangent value of each pixel may be calculated by using the structure tensor.

Specifically, a matrix of the structure is $$\begin{bmatrix} I1 & I2 \\ I3 & I4 \end{bmatrix} = \begin{bmatrix} dx*dx & dx*dy \\ dx*dy & dy*dy \end{bmatrix};$$

and an eigenvalue is $\lambda=I1+I4+\sqrt{(I1-I4)*(I1-I4)+4*I2*I3}$.

Therefore, a value of the x-direction of the tangent is flowx=$\lambda/2$-I1; and a value of the y-direction of the tangent is flowy=-I2.

Because the tangent value is a vector value, the value of the x-direction (abscissa) of the tangent and the value of the y-direction (ordinate) of the tangent together can form the tangent value of the pixel.

Therefore, a modulus value of the tangent value is $$v=\sqrt{flowx*flowx+flowy*flowy}.$$

Step 103: Determine whether a modulus value of the tangent value of each pixel is less than a preset threshold, and if yes, go to step 104, or if not, go to step 105.

Step 104: Determine a corresponding pixel as a non-boundary point of the image.

Step 105: Determine a corresponding pixel as a boundary point of the image.

The modulus value of the tangent value of each pixel can be used for determining whether the pixel is located in a boundary region. When the modulus value of the tangent value is less than the preset threshold, it can be considered that the pixel is located in a non-boundary region. Therefore, the pixels on the image can be classified into pixels in the boundary region, namely, boundary points of the image and pixels in the non-boundary region, namely, non-boundary points of the image. Because higher sharpness needs to be preserved for the boundary point of the image, in this embodiment of the present invention, image denoising needs to be performed by using different filter manners for the boundary points of the image and the non-boundary points of the image.

Step 106: Perform bilateral filter on a pixel determined as a non-boundary point of the image and pixels which are around the pixel and of which distances to the pixel are less than or equal to a first filtering radius.

Step 107: Perform bilateral filter on a pixel determined as a boundary point of the image and pixels whose distances to the pixel along tangent directions and opposite directions of the tangent directions are less than or equal to a second filtering radius.

It can be seen that pixels are classified into two categories for bilateral filter.

According to a first aspect, bilateral filter is performed on a pixel determined as a non-boundary point of the image and pixels which are around the pixel and of which distances to the pixel are less than or equal to a first filtering radius.

If a pixel is determined as a non-boundary point of the image, sample points for bilateral filter are this pixel and points which are around this pixel and of which distances to this pixel are less than or equal to the first filtering radius. For example, when the first filtering radius is 3, a total of 7*7=49 pixels that use this pixel as a center are taken as sample points for bilateral filter.

The bilateral filter is a non-linear filter method. It is a compromise processing manner that combines spatial proximity and pixel similarity of the image and also considers spatial information and gray similarity, achieves the objective of reducing noise while preserving the boundary, and features simple, non-iterative, and local processing.

The formula of bilateral filter is $$BF[I]_p = \frac{1}{W_p} \sum_{q \in S} G_{\sigma_d}(\|p - q\|) G_{\sigma_r}(I_p - I_q) I_q,$$

which is a normalized weighted average function, where $W_p$ is a standard quantity, $$W_p = \sum_{q \in S} G_{\sigma_d}(\|p - q\|) G_{\sigma_r}(I_p - I_q),$$

parameters $\sigma_d$ and $\sigma_r$ are filtering amounts for measuring an image I, $G_{\sigma_d}$ is a spatial function for reducing an interference of a distant pixel, $G_{\sigma_r}$ is a range function for reducing an interference of a pixel q whose gray value is different from that of $I_p$. In general cases, a spatial proximity function $G_{\sigma_d}$ and a gray similarity function $G_{\sigma_r}$ of a bilateral filter may be Gaussian functions using an Euclidean distance as a parameter, and specifically may be:

$$G_{\sigma_d} = e^{-\frac{1}{2}\left(\frac{d(p,q)}{\sigma_d}\right)^2};$$

$$G_{\sigma_r} = e^{-\frac{1}{2}\left(\frac{\delta(I(p),I(q))}{\sigma_d}\right)^2};$$

where $d(p,q)$ and $\delta(I(p),I(q))$ are an Euclidean distance between two pixels of the image and a gray difference between the pixels respectively; $\sigma_d$ and $\sigma_r$ are standard deviations based on the Gaussian function, and determine the performance of the bilateral filter; $\sigma_d$ and $\sigma_r$ may be selected according to the value of image noise in an actual application.

According to a second aspect, bilateral filter is performed on a pixel determined as a boundary point of the image and pixels whose distances to the pixel along tangent directions and opposite directions of the tangent directions are less than or equal to a second filtering radius.

In some embodiments of the present invention, specific implementation of the performing bilateral filter on a pixel determined as a boundary point of the image and pixels whose distances to the pixel along tangent directions and opposite directions of the tangent directions are less than or equal to a second filtering radius may include:

calculating a normalized tangent value according to the tangent value of each pixel and the modulus value of the tangent value of each pixel;

separately adding an abscissa value and an ordinate value of a normalized tangent value of a current pixel to an abscissa value and an ordinate value of the pixel, where a pixel corresponding to obtained coordinate values is a neighboring pixel of the current pixel along a tangent direction of the current pixel, and performing addition until all pixels whose distances to a start pixel along tangent directions are less than or equal to the second filtering radius are determined, where the start pixel is a pixel determined as a boundary point of the image;

separately subtracting an abscissa value and an ordinate value of a normalized tangent value of a current pixel from an abscissa value and an ordinate value of the pixel, where a pixel corresponding to obtained coordinate values is a neighboring pixel of the current pixel along an opposite direction of a tangent direction of the current pixel, and performing subtraction until all pixels whose distances to a start pixel along opposite directions of tangent directions are less than or equal to the second filtering radius are determined, where the start pixel is a pixel determined as a boundary point of the image; and performing bilateral filter on the pixel determined as a boundary point of the image and the pixels whose distances to the pixel along the tangent directions and the opposite directions of the tangent directions are less than or equal to the second filtering radius.

In other words, based on step 102 in this embodiment, it can be obtained that the modulus value of the tangent value is $v=\sqrt{flowx*flowx+flowy*flowy}$; in this case, the abscissa value of the normalized tangent value is flowx'=flowx/v, and the ordinate value of the normalized tangent value is flowy'=flowy/v.

Assuming that a position of a current pixel is (x, y), positions of two neighboring pixels found in the first step are (x+flowx', y+flowy') and (x−flowx', y−flowy'), and the two pixels are distributed as a neighboring pixel of the current pixel along the tangent direction and a neighboring pixel of the current pixel along the opposite direction of the tangent direction, and are separately denoted by P1 and P2. Assuming that normalized tangent values corresponding to P1 and P2 are (flowx1', flowy1') and (flowx2', flowy2') respectively, positions of two pixels found in the next step are (x+flowx'+flowx1', y+flowy'+flowy1') and (x−flowx'−flowx2', y−flowy'−flowy2') respectively. Search is performed in this manner according to the preset second filtering radius, and in this manner, a pixel determined as a boundary point of the image and pixels whose distances to the pixel along tangent directions and opposite directions of the tangent directions are less than or equal to the second filtering radius can be obtained.

If the second filtering radius is r, r*2 pixels can be found in the end. Therefore, for boundary points of the image, the second filtering radius is generally greater than the first filtering radius, so as to ensure the number of sample points. For example, the second filtering radius may be set to 5, and in this case, bilateral filter is performed by using a total of 11 pixels as sample points, where the 11 pixels include a pixel determined as a boundary point of the image and pixels whose distances to the pixel along tangent directions and opposite directions of the tangent directions are less than or equal to the second filtering radius. The manner of the bilateral filter is the same as that used for non-boundary points, and the difference lies in that a determining process and the number of sample points are different.

In this way, in this embodiment of the present invention, a tangent value of each pixel is calculated, and it is determined, according to a modulus value of the tangent value of each pixel, whether a pixel is a boundary point or a non-boundary point of the image. If a pixel is a non-boundary point of the image, the pixel and pixels which are around the pixel and of which distances to the pixel are less than or equal to a first filtering radius are sampled for filtering; in this manner, more sample points are taken, and a result is smoother, so that noise is completely removed. If a pixel is a boundary point of the image, starting from the pixel, only pixels along tangent directions and opposite directions of the tangent directions are sampled for filtering, thereby preserving the sharpness of the boundary while reducing noise.

In some embodiments of the present invention, before the calculating an abscissa gradient value and an ordinate gradient value of each pixel of an image, the method for implementing image filtering of this embodiment of the present invention may further include:

performing Gaussian blur on the image, where a standard deviation of a Gaussian distribution in the Gaussian blur is less than or equal to a preset deviation threshold.

In some embodiments of the present invention, before the calculating a tangent value of each pixel by using a structure tensor and according to the abscissa gradient value and the ordinate gradient value of each pixel, the method for implementing image filtering of this embodiment of the present invention may further include:

separately performing Gaussian blur on an abscissa gradient map of the image formed by the abscissa gradient value of each pixel and an ordinate gradient map of the image formed by the ordinate gradient value of each pixel, where a standard deviation of a Gaussian distribution in the Gaussian blur is less than or equal to a preset deviation threshold, and updating the abscissa gradient value and ordinate gradient value of each pixel.

Figure 2:
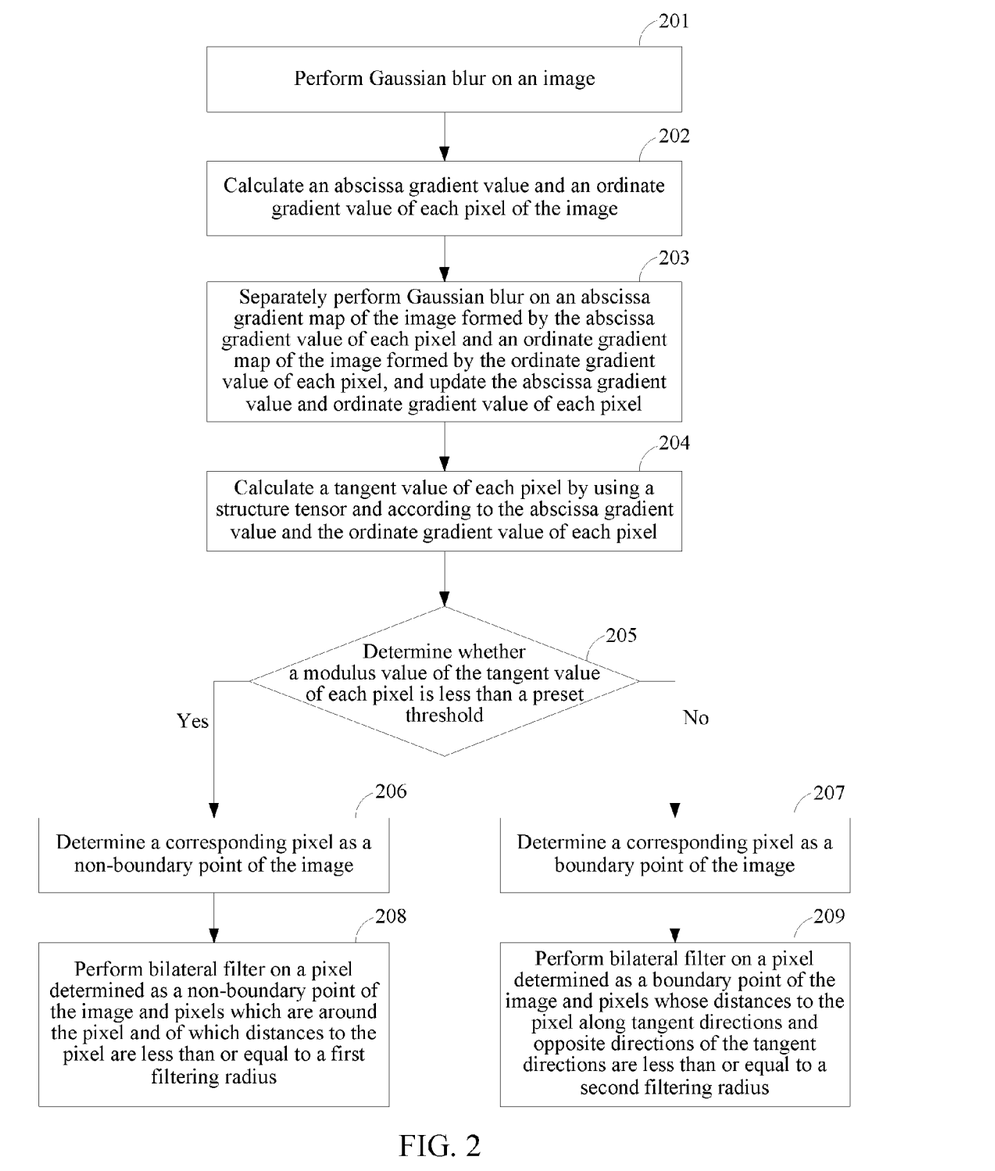
FIG. 2 is a flowchart of Embodiment 2 of a method for implementing image denoising according to an embodiment of the present invention.

As shown in FIG. 2, Embodiment 2 of a method for implementing image denoising according to an embodiment of the present invention may include the following steps:

Step 201: Perform Gaussian blur on an image, where a standard deviation of a Gaussian distribution in the Gaussian blur is less than or equal to a preset deviation threshold.

Performing Gaussian blur on the image to slightly reduce noise in advance achieves a better image denoising effect. The Gaussian blur is performing weighted averaging on a specified pixel and pixels around the specified pixel to obtain a final result, and a Gaussian distribution is used as a filter. The blur may be interpreted as taking an average value of peripheral pixels of each pixel. Apparently, it is improper to use a simple average, because every image is continuous, and closer pixels have a closer relationship while pixels more distant from each other have a more distant relationship. Therefore, the weighted average is more reasonable. A closer pixel has a greater weight, while a more distant pixel has a smaller weight.

The formula of the Gaussian function is $$G(u, v) = \frac{1}{2\pi\sigma^2} e^{-(u^2+v^2)/(2\sigma^2)},$$

where r is a blur radius, $r^2=u^2+v^2$, $\sigma$ is a standard deviation of a Gaussian distribution, and a smaller blur radius or a smaller value of a indicates a less intensified blur degree. In the formula, u and v represent an x-direction distance of this pixel from a central point and a y-direction distance of this pixel from the central point. In a case where the radius is determined, the blur degree can be adjusted by adjusting the value of $\sigma$.

After a weight of each sample pixel is calculated by using the Gaussian function, the weight is multiplied by a color value of the pixel, to obtain a value of contribution made by this pixel to a color of a target pixel, and finally, values of contribution of all sample pixels are added up to obtain the color of the blurred target pixel.

In this embodiment, the standard deviation a of the Gaussian distribution in the Gaussian blur needs to be less than or equal to the preset deviation threshold, so as to implement slight denoising without affecting boundary points.

Step 202: Calculate an abscissa gradient value and an ordinate gradient value of each pixel of the image.

Step 203: Separately perform Gaussian blur on an abscissa gradient map of the image formed by the abscissa gradient value of each pixel and an ordinate gradient map of the image formed by the ordinate gradient value of each pixel, where a standard deviation of a Gaussian distribution in the Gaussian blur is less than or equal to a preset deviation threshold, and update the abscissa gradient value and ordinate gradient value of each pixel.

The Gaussian blur is separately performed on the x-direction gradient map and the y-direction gradient map, so that boundary noise can be reduced slightly. The processed abscissa gradient value and ordinate gradient value are denoted by dr and dy respectively, and the processed gradient values used as an abscissa gradient value and an ordinate gradient value of each pixel for subsequent processing, to achieve a better image denoising effect.

Step 204: Calculate a tangent value of each pixel by using a structure tensor and according to the abscissa gradient value and the ordinate gradient value of each pixel.

Step 205: Determine whether a modulus value of the tangent value of each pixel is less than a preset threshold, and if yes, go to step 206, or if not, go to step 207.

Step 206: Determine a corresponding pixel as a non-boundary point of the image.

Step 207: Determine a corresponding pixel as a boundary point of the image.

Step 208: Perform bilateral filter on a pixel determined as a non-boundary point of the image and pixels which are around the pixel and of which distances to the pixel are less than or equal to a first filtering radius.

Step 209: Perform bilateral filter on a pixel determined as a boundary point of the image and pixels whose distances to the pixel along tangent directions and opposite directions of the tangent directions are less than or equal to a second filtering radius.

In this embodiment, slight Gaussian blur is performed on the image and gradient maps in advance to reduce noise slightly, so as to achieve a better image denoising effect. In addition, it can also be implemented that noise is reduced while the sharpness of the boundary is effectively preserved.

Figure 3:
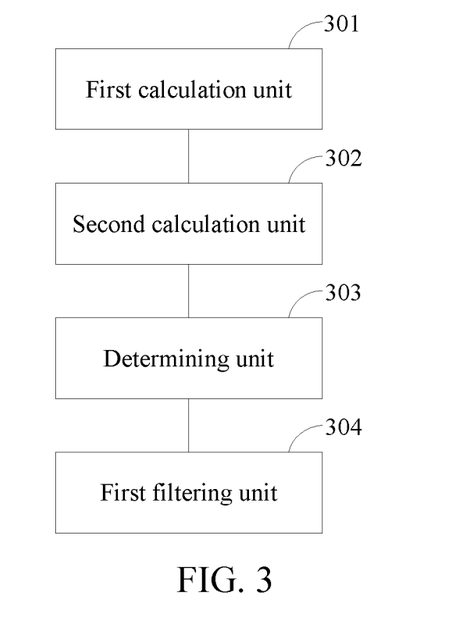
FIG. 3 is a schematic diagram of Embodiment 1 of an apparatus for implementing image denoising according to an embodiment of the present invention.

Referring to FIG. 3, an embodiment of the present invention further provides an apparatus for implementing image denoising. The apparatus may include:

a first calculation unit 301, configured to calculate an abscissa gradient value and an ordinate gradient value of each pixel of an image;

where in some embodiments of the present invention, the first calculation unit may be specifically configured to:

calculate the abscissa gradient value and the ordinate gradient value of each pixel of the image by using a Soble operator;

a second calculation unit 302, configured to calculate a tangent value of each pixel by using a structure tensor and according to the abscissa gradient value and the ordinate gradient value of each pixel;

a determining unit 303, configured to determine whether a modulus value of the tangent value of each pixel is less than a preset threshold, and if yes, determine a corresponding pixel as a non-boundary point of the image, or if not, determine a corresponding pixel as a boundary point of the image; and a first filter unit 304, configured to perform bilateral filter on a pixel determined as a non-boundary point of the image and pixels which are around the pixel and of which distances to the pixel are less than or equal to a first filtering radius, and perform bilateral filter on a pixel determined as a boundary point of the image and pixels whose distances to the pixel along tangent directions and opposite directions of the tangent directions are less than or equal to a second filtering radius.

In some embodiments of the present invention, the first filter unit may specifically include:

a calculation sub-unit, configured to calculate a normalized tangent value according to the tangent value of each pixel and the modulus value of the tangent value of each pixel;

a search sub-unit, configured to separately add an abscissa value and an ordinate value of a normalized tangent value of a current pixel to an abscissa value and an ordinate value of the pixel, where a pixel corresponding to obtained coordinate values is a neighboring pixel of the current pixel along a tangent direction of the current pixel, and perform addition until all pixels whose distances to a start pixel along tangent directions are less than or equal to the second filtering radius are determined, where the start pixel is a pixel determined as a boundary point of the image; and separately subtract an abscissa value and an ordinate value of a normalized tangent value of a current pixel from an abscissa value and an ordinate value of the pixel, where a pixel corresponding to obtained coordinate values is a neighboring pixel of the current pixel along an opposite direction of a tangent direction of the current pixel, and perform subtraction until all pixels whose distances to a start pixel along opposite directions of tangent directions are less than or equal to the second filtering radius are determined, where the start pixel is a pixel determined as a boundary point of the image; and a filter sub-unit, configured to perform bilateral filter on the pixel determined as a boundary point of the image and the pixels whose distances to the pixel along the tangent directions and the opposite directions of the tangent directions are less than or equal to the second filtering radius.

In some embodiments of the present invention, the filter sub-unit of the first filter unit may further be configured to perform bilateral filter on a pixel determined as a non-boundary point of the image and pixels which are around the pixel and of which distances to the pixel are less than or equal to the first filtering radius.

Figure 4:
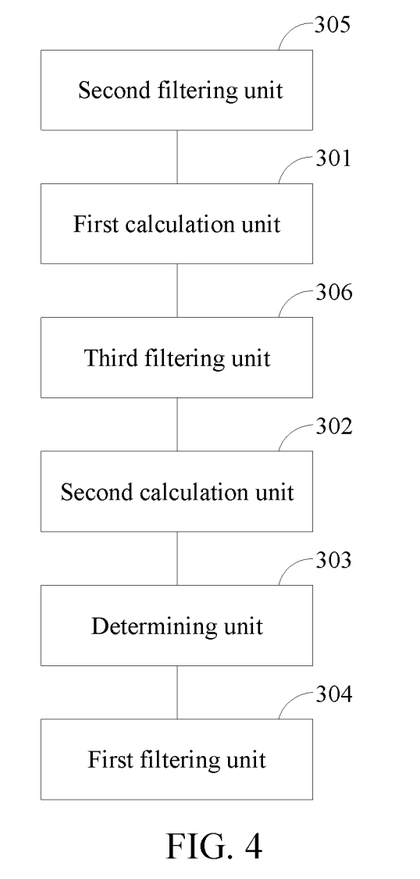
FIG. 4 is a schematic diagram of Embodiment 2 of an apparatus for implementing image denoising according to an embodiment of the present invention.

As shown in FIG. 4, in some embodiments of the present invention, the apparatus for implementing image denoising in this embodiment of the present invention may further include:

a second filter unit 305, configured to perform Gaussian blur on the image, where a standard deviation of a Gaussian distribution in the Gaussian blur is less than or equal to a preset deviation threshold.

In some embodiments of the present invention, the apparatus for implementing image denoising in this embodiment of the present invention may further include:

a third filter unit 306, configured to separately perform Gaussian blur on an abscissa gradient map of the image formed by the abscissa gradient value of each pixel and an ordinate gradient map of the image formed by the ordinate gradient value of each pixel, where a standard deviation of a Gaussian distribution in the Gaussian blur is less than or equal to a preset deviation threshold, and update the abscissa gradient value and ordinate gradient value of each pixel.

In this way, in this embodiment of the present invention, a tangent value of each pixel is calculated, and it is determined, according to a modulus value of the tangent value of each pixel, whether a pixel is a boundary point or a non-boundary point of the image. If a pixel is a non-boundary point of the image, the pixel and pixels which are around the pixel and of which distances to the pixel are less than or equal to a first filtering radius are sampled for filtering; in this manner, more sample points are taken, and a result is smoother, so that noise is completely removed. If a pixel is a boundary point of the image, starting from the pixel, only pixels along tangent directions and opposite directions of the tangent directions are sampled for filtering, thereby preserving the sharpness of the boundary while reducing noise.

Figure 5:
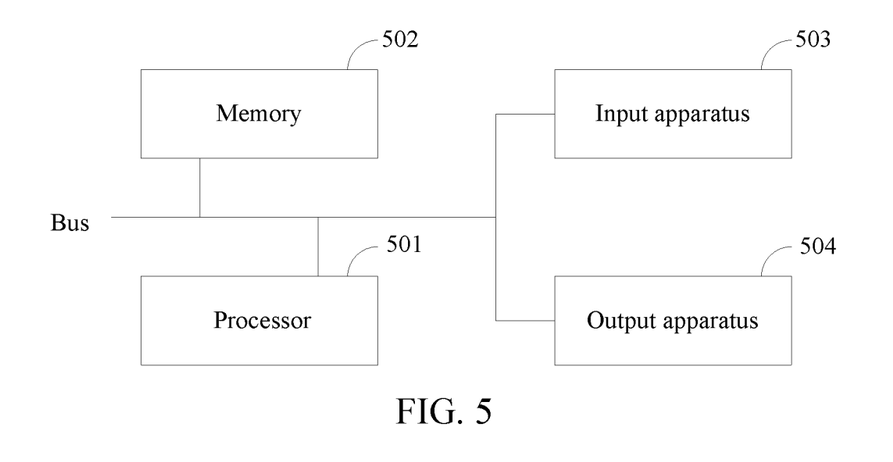
FIG. 5 is a schematic diagram of a terminal according to an embodiment of the present invention.

Correspondingly, an embodiment of the present invention further provides a terminal. As shown in FIG. 5, the terminal may include:

a processor 501, a memory 502, an input apparatus 503, and an output apparatus 504. A browser server may be provided with one or more processors 501. In FIG. 5, one processor is used as an example. In some embodiments of the present invention, the processor 501, the memory 502, the input apparatus 503, and the output apparatus 504 may be connected by a using bus or by other means, where the connection by means of a bus is used as an example in FIG. 5.

The memory 502 may be configured to store a software program and module, and the processor 501 runs the software program and module stored in the memory 502 to implement various functional applications and data processing of the browser server. The memory 502 may mainly include a program storage area and a data storage area. The program storage area may store an operating system, an application program required by at least one function, and the like. In addition, the memory 502 may include a high-speed random access memory, and may also include a non-volatile memory, such as at least one magnetic disk storage device, a flash memory, or another volatile solid-state storage device. The input apparatus 503 may be configured to receive input digit or character information, and generate key signal input related to the user setting and function control of the browser server.

Specifically, in this embodiment, the processor 501 loads, to the memory, executable files corresponding to processes of one or more application programs according to the following instructions, and the processor 501 runs the application programs stored in the memory 502, so as to implement various functions:

calculating an abscissa gradient value and an ordinate gradient value of each pixel of an image;

calculating a tangent value of each pixel by using a structure tensor and according to the abscissa gradient value and the ordinate gradient value of each pixel;

determining whether a modulus value of the tangent value of each pixel is less than a preset threshold, and if yes, determining a corresponding pixel as a non-boundary point of the image, or if not, determining a corresponding pixel as a boundary point of the image; and performing bilateral filter on a pixel determined as a non-boundary point of the image and pixels which are around the pixel and of which distances to the pixel are less than or equal to a first filtering radius, and performing bilateral filter on a pixel determined as a boundary point of the image and pixels whose distances to the pixel along tangent directions and opposite directions of the tangent directions are less than or equal to a second filtering radius.

Correspondingly, before the calculating an abscissa gradient value and an ordinate gradient value of each pixel of an image, the following instruction is further included:

performing Gaussian blur on the image, where a standard deviation of a Gaussian distribution in the Gaussian blur is less than or equal to a preset deviation threshold.

Correspondingly, before the calculating a tangent value of each pixel by using a structure tensor and according to the abscissa gradient value and the ordinate gradient value of each pixel, the following instruction is further included:

separately performing Gaussian blur on an abscissa gradient map of the image formed by the abscissa gradient value of each pixel and an ordinate gradient map of the image formed by the ordinate gradient value of each pixel, where a standard deviation of a Gaussian distribution in the Gaussian blur is less than or equal to a preset deviation threshold, and updating the abscissa gradient value and ordinate gradient value of each pixel.

Correspondingly, the performing bilateral filter on a pixel determined as a boundary point of the image and pixels whose distances to the pixel along tangent directions and opposite directions of the tangent directions are less than or equal to a second filtering radius includes:

calculating a normalized tangent value according to the tangent value of each pixel and the modulus value of the tangent value of each pixel;

separately adding an abscissa value and an ordinate value of a normalized tangent value of a current pixel to an abscissa value and an ordinate value of the pixel, where a pixel corresponding to obtained coordinate values is a neighboring pixel of the current pixel along a tangent direction of the current pixel, and performing addition until all pixels whose distances to a start pixel along tangent directions are less than or equal to the second filtering radius are determined, where the start pixel is a pixel determined as a boundary point of the image;

separately subtracting an abscissa value and an ordinate value of a normalized tangent value of a current pixel from an abscissa value and an ordinate value of the pixel, where a pixel corresponding to obtained coordinate values is a neighboring pixel of the current pixel along an opposite direction of a tangent direction of the current pixel, and performing subtraction until all pixels whose distances to a start pixel along opposite directions of tangent directions are less than or equal to the second filtering radius are determined, where the start pixel is a pixel determined as a boundary point of the image; and performing bilateral filter on the pixel determined as a boundary point of the image and the pixels whose distances to the pixel along the tangent directions and the opposite directions of the tangent directions are less than or equal to the second filtering radius.

Correspondingly, the calculating an abscissa gradient value and an ordinate gradient value of each pixel of an image includes:

calculating the abscissa gradient value and the ordinate gradient value of each pixel of the image by using a Soble operator;

In this way, in this embodiment of the present invention, a tangent value of each pixel is calculated, and it is determined, according to a modulus value of the tangent value of each pixel, whether a pixel is a boundary point or a non-boundary point of the image. If a pixel is a non-boundary point of the image, the pixel and pixels which are around the pixel and of which distances to the pixel are less than or equal to a first filtering radius are sampled for filtering; in this manner, more sample points are taken, and a result is smoother, so that noise is completely removed. If a pixel is a boundary point of the image, starting from the pixel, only pixels along tangent directions and opposite directions of the tangent directions are sampled for filtering, thereby preserving the sharpness of the boundary while reducing noise.

It should be noted that the embodiments in this specification are all described in a progressive manner. Description of each of the embodiments focuses on differences from other embodiments, and reference may be made to each other for the same or similar parts among respective embodiments. The apparatus system or apparatus disclosed in the embodiments are corresponding to the method disclosed in the embodiments, and therefore are only briefly described, and reference may be made to the method embodiments for the associated part.

It should further be noted that the relational terms herein such as first and second are used only to differentiate an entity or operation from another entity or operation, and do not require or imply any actual relationship or sequence between these entities or operations. Moreover, the terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements existing in the process, the method, the object, or the device that includes the element.

Steps combining the methods or algorithms described in the embodiments disclosed herein may be directly implemented by hardware, a software module executed by a processor, or a combination thereof. The software module may be set in a random access memory (RAM), an internal memory, a read-only memory (ROM), an electrically programmable ROM, an electrically erasable programmable ROM, a register, a hard disk, a mobile magnetic disk, a CD-ROM, or a storage medium of any other form commonly known in the technical field.

The description of the disclosed embodiments enables a person skilled in the art to implement or use the present invention. Various modifications to these embodiments are apparent to a person skilled in the art, and general principles defined herein may be implemented in other embodiments without departing from the spirit or scope of the present invention. Therefore, the present invention is not limited to the embodiments herein, but is intended to cover a broadest scope consistent with the principle and the novelty disclosed herein.

The invention claimed is:

1. A method for implementing image denoising, comprising:

calculating an abscissa gradient value and an ordinate gradient value of each pixel of an image;

calculating a tangent value of each pixel by using a structure tensor and according to the abscissa gradient value and the ordinate gradient value of each pixel;

determining whether a modulus value of the tangent value of each pixel is less than a preset threshold, when the modulus value of the tangent value of each pixel is less than the preset threshold, determining a corresponding pixel as a non-boundary point of the image, when the modulus value of the tangent value of each pixel is more than or equal to the preset threshold, determining a corresponding pixel as a boundary point of the image; and performing bilateral filter on a pixel determined as a non-boundary point of the image and pixels which are around the pixel and of which distances to the pixel are less than or equal to a first filtering radius, and performing bilateral filter on a pixel determined as a boundary point of the image and pixels whose distances to the pixel along tangent directions and opposite directions of the tangent directions are less than or equal to a second filtering radius.

2. The method according to claim 1, wherein before the calculating an abscissa gradient value and an ordinate gradient value of each pixel of an image, the method further comprises:

performing Gaussian blur on the image, wherein a standard deviation of a Gaussian distribution in the Gaussian blur is less than or equal to a preset deviation threshold.

3. The method according to claim 1, wherein before the calculating a tangent value of each pixel by using a structure tensor and according to the abscissa gradient value and the ordinate gradient value of each pixel, the method further comprises:

separately performing Gaussian blur on an abscissa gradient map of the image formed by the abscissa gradient value of each pixel and an ordinate gradient map of the image formed by the ordinate gradient value of each pixel, wherein a standard deviation of a Gaussian distribution in the Gaussian blur is less than or equal to a preset deviation threshold, and updating the abscissa gradient value and ordinate gradient value of each pixel.

4. The method according to claim 1, wherein the performing bilateral filter on a pixel determined as a boundary point of the image and pixels whose distances to the pixel along tangent directions and opposite directions of the tangent directions are less than or equal to a second filtering radius comprises:

calculating a normalized tangent value according to the tangent value of each pixel and the modulus value of the tangent value of each pixel;

separately adding an abscissa value and an ordinate value of a normalized tangent value of a current pixel to an abscissa value and an ordinate value of the pixel, wherein a pixel corresponding to obtained coordinate values is a neighboring pixel of the current pixel along a tangent direction of the current pixel, and performing addition until all pixels whose distances to a start pixel along tangent directions are less than or equal to the second filtering radius are determined, wherein the start pixel is a pixel determined as a boundary point of the image;

separately subtracting an abscissa value and an ordinate value of a normalized tangent value of a current pixel from an abscissa value and an ordinate value of the pixel, wherein a pixel corresponding to obtained coordinate values is a neighboring pixel of the current pixel along an opposite direction of a tangent direction of the current pixel, and performing subtraction until all pixels whose distances to a start pixel along opposite directions of tangent directions are less than or equal to the second filtering radius are determined, wherein the start pixel is a pixel determined as a boundary point of the image; and performing bilateral filter on the pixel determined as a boundary point of the image and the pixels whose distances to the pixel along the tangent directions and the opposite directions of the tangent directions are less than or equal to the second filtering radius.

5. The method according to claim 1, wherein the calculating an abscissa gradient value and an ordinate gradient value of each pixel of an image comprises:

calculating the abscissa gradient value and the ordinate gradient value of each pixel of the image by using a Soble operator.

6. An apparatus for implementing image denoising, comprising:

a first calculation unit, configured to calculate an abscissa gradient value and an ordinate gradient value of each pixel of an image;

a second calculation unit, configured to calculate a tangent value of each pixel by using a structure tensor and according to the abscissa gradient value and the ordinate gradient value of each pixel;

a determining unit, configured to determine whether a modulus value of the tangent value of each pixel is less than a preset threshold, when the modulus value of the tangent value of each pixel is less than the preset threshold, determine a corresponding pixel as a non-boundary point of the image, when the modulus value of the tangent value of each pixel is more than or equal to the preset threshold, determine a corresponding pixel as a boundary point of the image; and a first filter unit, configured to perform bilateral filter on a pixel determined as a non-boundary point of the image and pixels which are around the pixel and of which distances to the pixel are less than or equal to a first filtering radius, and perform bilateral filter on a pixel determined as a boundary point of the image and pixels whose distances to the pixel along tangent directions and opposite directions of the tangent directions are less than or equal to a second filtering radius.

7. The apparatus according to claim 6, wherein the apparatus further comprises:

a second filter unit, configured to perform Gaussian blur on the image, wherein a standard deviation of a Gaussian distribution in the Gaussian blur is less than or equal to a preset deviation threshold.

8. The apparatus according to claim 6, wherein the apparatus further comprises:

a third filter unit, configured to separately perform Gaussian blur on an abscissa gradient map of the image formed by the abscissa gradient value of each pixel and an ordinate gradient map of the image formed by the ordinate gradient value of each pixel, wherein a standard deviation of a Gaussian distribution in the Gaussian blur is less than or equal to a preset deviation threshold, and update the abscissa gradient value and ordinate gradient value of each pixel.

9. The apparatus according to claim 6, wherein the first filter unit comprises:

a calculation sub-unit, configured to calculate a normalized tangent value according to the tangent value of each pixel and the modulus value of the tangent value of each pixel;

a search sub-unit, configured to separately add an abscissa value and an ordinate value of a normalized tangent value of a current pixel to an abscissa value and an ordinate value of the pixel, wherein a pixel corresponding to obtained coordinate values is a neighboring pixel of the current pixel along a tangent direction of the current pixel, and perform addition until all pixels whose distances to a start pixel along tangent directions are less than or equal to the second filtering radius are determined, wherein the start pixel is a pixel determined as a boundary point of the image; and separately subtract an abscissa value and an ordinate value of a normalized tangent value of a current pixel from an abscissa value and an ordinate value of the pixel, wherein a pixel corresponding to obtained coordinate values is a neighboring pixel of the current pixel along an opposite direction of a tangent direction of the current pixel, and perform subtraction until all pixels whose distances to a start pixel along opposite directions of tangent directions are less than or equal to the second filtering radius are determined, wherein the start pixel is a pixel determined as a boundary point of the image; and a filter sub-unit, configured to perform bilateral filter on the pixel determined as a boundary point of the image and the pixels whose distances to the pixel along the tangent directions and the opposite directions of the tangent directions are less than or equal to the second filtering radius.

10. The apparatus according to claim 6, wherein the first calculation unit is specifically configured to:

calculate the abscissa gradient value and the ordinate gradient value of each pixel of the image by using a Soble operator.

* * * * *